(12) United States Patent
Sumetsky

(10) Patent No.: US 9,127,933 B2
(45) Date of Patent: Sep. 8, 2015

(54) METHOD OF FABRICATING SURFACE NANOSCALE AXIAL PHOTONIC DEVICES

(71) Applicant: OFS Fitel, LLC, Norcross, GA (US)

(72) Inventor: Mikhail Sumetsky, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 140 days.

(21) Appl. No.: 14/035,354

(22) Filed: Sep. 24, 2013

(65) Prior Publication Data

US 2014/0211198 A1 Jul. 31, 2014

Related U.S. Application Data

(60) Provisional application No. 61/705,258, filed on Sep. 25, 2012.

(51) Int. Cl.

| | |
|---|---|
| *G01B 11/08* | (2006.01) |
| *G01M 11/00* | (2006.01) |
| *G02B 6/02* | (2006.01) |
| *G02B 6/10* | (2006.01) |
| *G02B 6/293* | (2006.01) |
| *B82Y 20/00* | (2011.01) |
| *G02B 6/42* | (2006.01) |

(52) U.S. Cl.
CPC ............... *G01B 11/08* (2013.01); *G01M 11/37* (2013.01); *G02B 6/0229* (2013.01); *G02B 6/29341* (2013.01); *B82Y 20/00* (2013.01); *G02B 6/107* (2013.01); *G02B 6/4201* (2013.01)

(58) Field of Classification Search
None
See application file for complete search history.

(56) References Cited

U.S. PATENT DOCUMENTS

| | | | | |
|---|---|---|---|---|
| 8,860,935 | B2* | 10/2014 | Sumetsky | 356/73.1 |
| 2005/0207713 | A1* | 9/2005 | Mazur et al. | 385/123 |
| 2012/0213474 | A1* | 8/2012 | DiGiovanni et al. | 385/30 |
| 2014/0090425 | A1* | 4/2014 | Diddams et al. | 65/378 |

OTHER PUBLICATIONS

Sumetsky, Mikhail, et al., "Surface Nanoscale Axial Photonics: Robust Fabrication of High Quality Factor Microresonators", Optics Letters/vol. 36, No. 24/Dec. 15, 2011, pp. 4824-4826.
Sumetsky, Mikhail, et al., "Surface Nanoscale Axial Photonics", Dec. 19, 2011/vol. 19, No. 27/Optics Express, pp. 26470-26485.

* cited by examiner

*Primary Examiner* — Gordon J Stock, Jr.
(74) *Attorney, Agent, or Firm* — Wendy W. Koba, Esq.

(57) ABSTRACT

A method of characterizing and correcting effective radius variations in a surface nanoscale axial photonic (SNAP) device that comprises a plurality of separate optical microdevices includes the steps of characterizing an as-fabricated SNAP device to determine local effective radius values of the plurality of separate optical microdevices, calibrating the as-fabricated SNAP device to determine a correction factor defined as a change in effective radius associated with a predetermined corrective treatment and then correcting individual microdevices by the application of a number of refractive index-changing treatments, the number of treatments applied to individual microdevices determined by the amount of correction required and the correction factor determined in the calibrating step. A number of iterations of the characterizing and correcting operations can be performed, achieving less than an Angstrom variation in effective radius variation. An apparatus for performing the method is also disclosed.

20 Claims, 6 Drawing Sheets

METHOD OF FABRICATING SURFACE NANOSCALE AXIAL PHOTONIC DEVICES

CROSS-REFERENCE TO RELATED APPLICATIONS

This application claims the benefit of U.S. Provisional Application Ser. No. 61/705,258, filed Sep. 25, 2012 and herein incorporated by reference.

TECHNICAL FIELD

The present invention relates to a method of fabricating surface nanoscale axial photonic (SNAP) devices and, more particularly, to utilizing a "characterize and correct" process to locally modify the effective radius of a SNAP device along its length and create desired optical characteristics with sub-Angstrom accuracy.

BACKGROUND OF THE INVENTION

Miniature resonant photonic devices as known in the art are created from coupled high Q-factor cavities (e.g., ring resonators, photonic crystal resonators or the like). The resonance is a result of circulating whispering gallery modes (WGMs) that are created within circular structures (such as around the circumference of an optical fiber), where the WGMs traveling around the circumference of the structure undergo repeated internal reflections at near-grazing incidence. The leakage of light can be very small in these structures, leading to high intrinsic quality factors (Q factors). The Q factor is generally defined as a measure of energy loss relative to the energy stored in a resonator (or any type of oscillating device), and can be characterized by the center frequency of a resonator divided by its bandwidth (a common value for a "high Q" resonator is a value on the order of $10^9$ or more). The preferred "high Q" resonator is therefore associated with a relatively narrow and sharp-peaked resonance feature.

Conventional resonator structures are formed by creating features whose size is of the order of the wavelength of the propagating optical signal, or greater. For example, known rings or toroids or spheres are typically tens of microns in dimension. Such structures are commonly created using lithographic techniques (for example, etching a silicon material to create the feature pattern) with the undesirable result of surface roughness. The lithography-associated roughness leads to scattering of a propagating optical signal, reducing the Q factor of the device. In addition, the inaccuracies of the conventional fabrication process limit the precision with which multiple devices can be coupled together to form more complex structures. While it would be useful to create resonators with even smaller dimensions (i.e., sub-wavelength), which offers certain advantages in terms of performance, such smaller dimensions pose additional difficulties in fabrication.

Previously, we have developed various complex, coupled photonic microdevices within and along an optical fiber, using sub-wavelength-sized perturbations of the fiber's radius to create resonance cavities. Multiple microstructures may be formed along a given length of optical fiber and coupled together to create complex photonic microdevices. Details of this device structure can be found in commonly-assigned US Publication 2012/0213474, dated Aug. 23, 2012 and hereby incorporated by reference.

However, when attempting to create relatively long chains of these devices, fabrication errors begin to impair their performance, with the errors growing with the length of the chain. One source of error may be nanometer-scale non-uniformities in radius of the fiber, which may then continue in cumulative fashion to affect all devices along the chain. Other sources of fabrication error in creating long chains of microresonators include, but are not limited to, surface contamination of the fiber, imperfections in system alignment (i.e., the system used to create the effective radius variations in the first instance), fluctuations of the beam power used to create effective radius variations, non-uniform doping profiles in photosensitive fibers and the like.

SUMMARY OF THE INVENTION

The needs remaining in the art are addressed by the present invention, which relates to a method of fabricating surface nanoscale axial photonic (SNAP) devices and, more particularly, to utilizing an in-line corrective process to locally modify the effective radius of a SNAP device along its length and create desired optical characteristics with sub-Angstrom accuracy.

In accordance with one embodiment, the present invention describes a method of characterizing and correcting effective radius variations in a surface nanoscale axial photonic (SNAP) device that comprises a plurality of separate optical microdevices. The method includes the steps of: (1) characterizing an as-fabricated SNAP device to determine the local effective radius value of each optical microdevice, calibrating the as-fabricated SNAP device to determine an appropriate correction factor, defined as a change in effective radius associated with a predetermined "treatment" (i.e., a time-dependent annealing process or UV radiation exposure); and then (3) correcting individual microdevices by the application of a number of treatments, the number of treatments applied to individual microdevices determined by the amount of correction required and the correction factor determined in the calibrating step. A number of iterations of the characterizing and correcting operations can be performed, achieving less than an Angstrom variation in effective radius variation. An apparatus for performing the method is also disclosed.

In another embodiment, the present invention describes an apparatus for performing characterization and correction of the resonant characteristics of a surface nanoscale axial photonic (SNAP) device. The apparatus includes a characterization stage for measuring a local resonant wavelength value for each individual optical microdevice forming the SNAP device and an exposure stage for applying a predetermined number of treatments (annealing processes or UV radiation exposures) to individual optical microdevices, the predetermined number of treatments calculated based upon a known change in effective radius associated with a known annealing energy and duration, or UV radiation exposure.

These and other embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 8(a) is a surface plot of the set of resonators subsequent to the initial formation of the SNAP device, FIG. 8(b) is a surface plot of the same SNAP device subsequent to the calibration operation; and FIG. 8(c) is a surface plot of the SNAP device after performing the individual correction operations on each microresonator, in accordance with the present invention.

DETAILED DESCRIPTION

Figure 1:
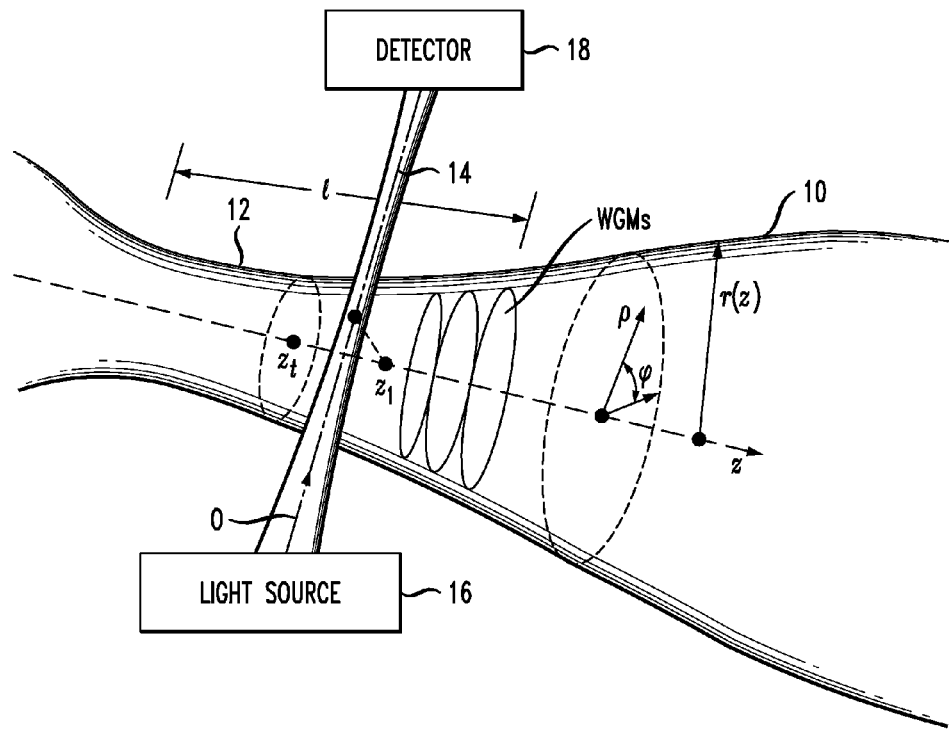
FIG. 1 illustrates an exemplary arrangement for supporting whispering gallery mode (WGM) resonances within a tapered section of optical fiber.

FIG. 1 illustrates an exemplary arrangement that is utilized to create WGMs in a tapered section of optical fiber, as more fully described in our co-pending application cited above. As shown, a section of optical fiber 10 (hereinafter referred to as "device fiber 10") is formed to include a tapered region 12, where the tapering is formed on a nanometer scale. That is, the radius of device fiber 10 is formed to decrease on a nanometer scale as a function of the length of the fiber. An exemplary length l of tapered region 12 is generally on the order of the wavelength associated with a propagating optical signal (e.g., for a 1.3 or 1.5 µm input signal, a tapered region having a length l on the order of one micron is suitable). As will be described in detail hereinbelow, the modification of the fiber radius (i.e., "tapering") may include a physical change in the actual radius of the fiber, a local modification in the refractive index of the fiber, or both a physical radius change and a refractive index change—all referred to in this application as changes in the "effective radius" of an optical fiber.

Continuing with the description of FIG. 1, an optical microfiber 14 supplies an input optical signal to device fiber 10. In general, a "microfiber" is defined as an optical fiber having a diameter on the order of about 0.1 to 10 times the propagating wavelength; for a 1.5 µm signal, this translates to a diameter on the order of 0.15-15 microns. It is to be understood that any suitable type of optical waveguiding device that creates evanescent coupling may be used to provide an input signal to device fiber 10, with the present discussion using the term "microfiber" for convenience only. Referring to FIG. 1, optical microfiber 14 is positioned close enough to device fiber 10 so that evanescent coupling occurs and at least a portion of the optical signal propagating along microfiber 14 transfers to device fiber 10.

A light source 16 is shown as used to introduce an optical signal O into microfiber 14. As optical signal O propagates along microfiber 14, a portion will evanescently couple into tapered region 12 of device fiber 10 and create WGMs in device fiber 10 within the vicinity of the overlap between device fiber 10 and microfiber 14, as shown in FIG. 1. Optical signal O continues to propagate along microfiber 14 and is ultimately coupled into a detector 18, which measures the characteristics of the received signal to monitor the resonant behavior within device fiber 10, as will be discussed in detail below.

The characteristic length of the WGMs along device fiber 10 as discussed below is on the order of $\Delta z \sim 100$ µm. As a result, a nanometer-scale fiber radius variation along this length corresponds to an extremely large radius of curvature R on the order of 1 meter. For the arrangement of FIG. 1, it can be shown that a resonance associated with the WGMs will be fully confined between a turning point, $z_t$, and the point where microfiber 14 couples to device fiber 10 (shown as point $z_1$ in FIG. 1).

Figure 2:
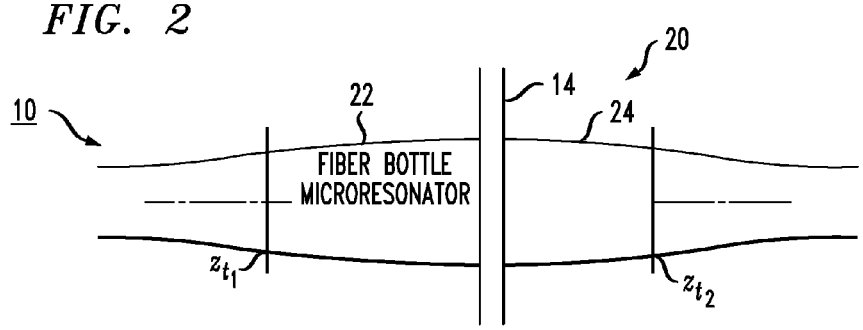
FIG. 2 illustrates an alternative resonant structure created within a "bottle"-like tapered region of an optical fiber.

FIG. 2 illustrates a configuration where device fiber 10 includes a "bottle" region 20 instead of a tapered region 12 as shown in the device of FIG. 1. Referring to FIG. 2, region 20 of device fiber 10 includes a first portion 22 having a monotonically increasing fiber radius, followed by a second portion 24 having a monotonically decreasing fiber radius. Again, these monotonic increases and decreases are on the nanometer scale. Microfiber 14 is used in a similar fashion as described above to excite WGMs within bottle region 20. For this configuration, the WGMs are confined along device fiber 10 between turning points $z_{t1}$ and $z_{t2}$.

For the purposes of the present invention, device fiber 10 (in particular, tapered regions 12, 22 or 24) is assumed to have a small, nanometer-scale radius variation defined as follows:

$$r(z) - r_O = =\Delta r(z),$$

where $r_O$ is the nominal fiber radius, and z is defined as the fiber axis. The WGMs excited by microfiber 14 experience resonances in the vicinity of the wavelengths defined by:

$$\lambda = \lambda_q = 2\pi n_{\mathit{eff}} r_O / q,$$

where q is a large positive integer and $n_{\mathit{eff}}$ is the effective refractive index of the WGM. For the purposes of this analysis, microfiber 14 is considered to be a point source of coherent light launched at the surface of device fiber 10 at the location $z=z_1$, with a wavelength $\lambda_c$ near the resonance, that is $|\lambda_c - \lambda_q| << \lambda_q / q$. It can also be shown that the radius variation $\Delta r(z)$ supports fully localized states (also referred to as "bottle states") for the configuration shown in FIG. 2. For a conventional optical fiber with the same parameters as defined above, the configuration of FIG. 2 yields a value of $\Delta \lambda_{FSR}$ on the order of 2 pm.

The phenomena as described above has now opened up research into more complex devices, based on the ability to create WGMs within sections of optical fiber having these types of effective radius variations. In particular, surface nanoscale axial photonics (SNAP) is an emerging area of study regarding microscopic optical devices that are created by smooth and dramatically small nanoscale variations of the optical fiber's radius and/or its refractive index (i.e., "effective radius variation").

Figure 3:
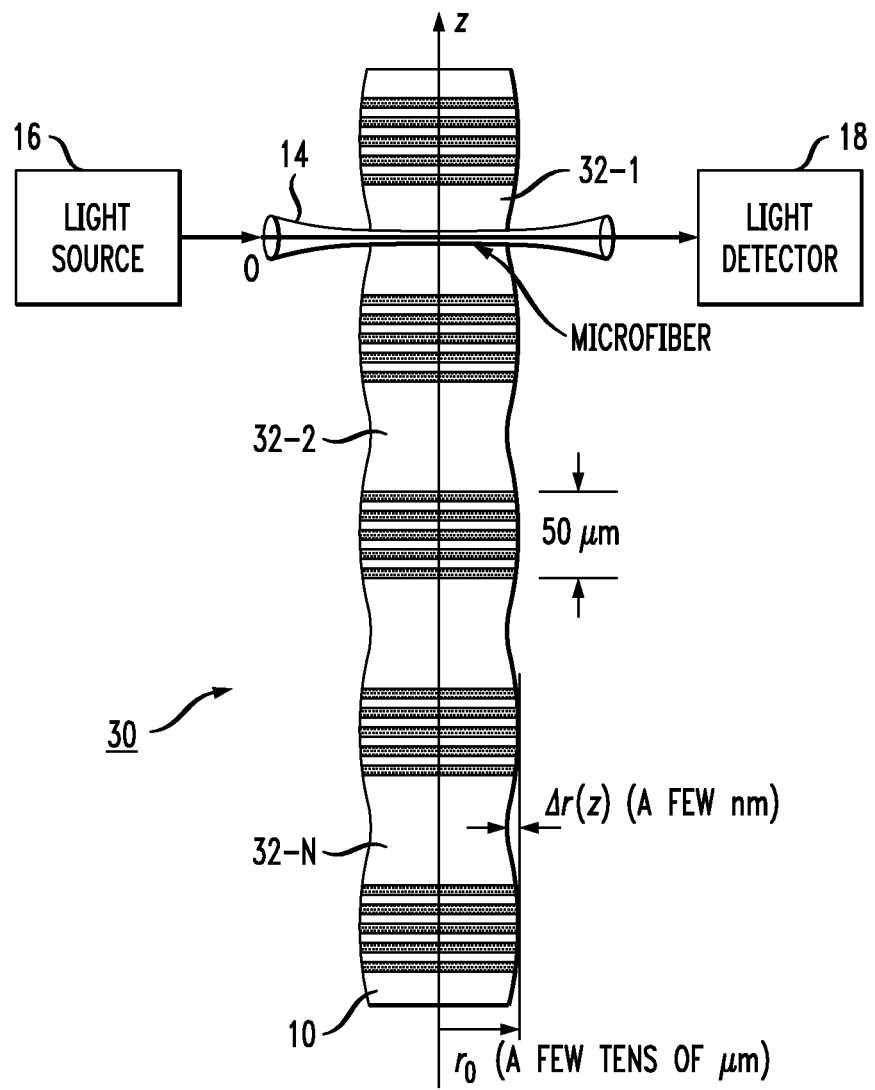
FIG. 3 depicts a surface nanoscale axial photonic (SNAP) device formed to include a plurality of microresonators distributed along a longitudinal extent of an optical fiber.

FIG. 3 illustrates an exemplary SNAP device 30 which comprises a plurality of N microscopic optical devices formed along a single optical fiber. In this example, SNAP device 30 comprises a plurality of N microresonators 32 disposed along a length of optical fiber 34. As shown, resonators 32-1, 32-2, ..., 32-N are formed along fiber 34 and separated by an inter-resonator spacing on the order 50 µm (for example). In this device, the introduced WGMs will circulate around the circumference of optical fiber 34 within the confines of each separate resonator 32-i, as well as slowly propagate along the longitudinal axis z of optical fiber 34. The direction of light propagation in SNAP device 30 is defined as that light traveling along longitudinal axis z, which will naturally be "slow" (compared to the known speed of light), as a result of the periodic revolutions of the light around the circumference of the fiber within each microresonator before the light begins to transfer its energy to the next microresonator in the sequence.

As with the arrangements described above, an optical signal is evanescently coupled into SNAP device 30 via microfiber 14, which is coupled between light source 16 and light detector 18. In the particular embodiment shown in FIG. 3, SNAP device 30 is formed of a "coreless" silica optical fiber 34 with a radius $r_O$ on the order of, for example, 15-20 μm. The plurality of microresonators 32-1 through 32-N are formed by introducing local variations in effective radius $\Delta r(z)$ on the order of a few nanometers (nm).

In most cases, SNAP devices are fabricated of drawn silica fiber and, as a result, exhibit small losses and high Q-factors, similar to those of silica WGM microresonators (although it is contemplated that materials other than silica may be used). Additionally, the characteristic axial wavelength of these SNAP devices is much greater than the wavelength of light, which makes them convenient for investigation of fundamental properties of light (e.g., tunneling, halting by a point source, formation of dark states, and the like). However, it is to be understood that SNAP devices may be formed of other optical materials besides silica (for example, other oxide and non-oxide glasses or crystalline materials such as silicon, germanium or indium phosphide), in general any material suitably transparent to the optical radiation wavelengths of interest. Additionally, these SNAP devices and may take forms other than the traditional cylindrical form of optical fiber (i.e., spherical, toroidal, parabolic, etc.).

Advantages of SNAP devices over substrate-based optical microdevices can be attributed to the ability to create strong, micron-scale localization of light with nanometer-scale variation of the optical fiber radius, as described above, with the possibility of achieving sub-nanoscale effective radius variations. This accuracy is substantially higher than the accuracy achieved in the conventional lithographic fabrication of microphotonic devices (i.e., silicon substrate-based photonic devices). For comparison, while the characteristic reproducibility of lithographic fabrication is on the order of a few nanometers, the reproducibility of SNAP devices of the present invention can be less than an angstrom (at least an order of magnitude smaller).

Figure 4:
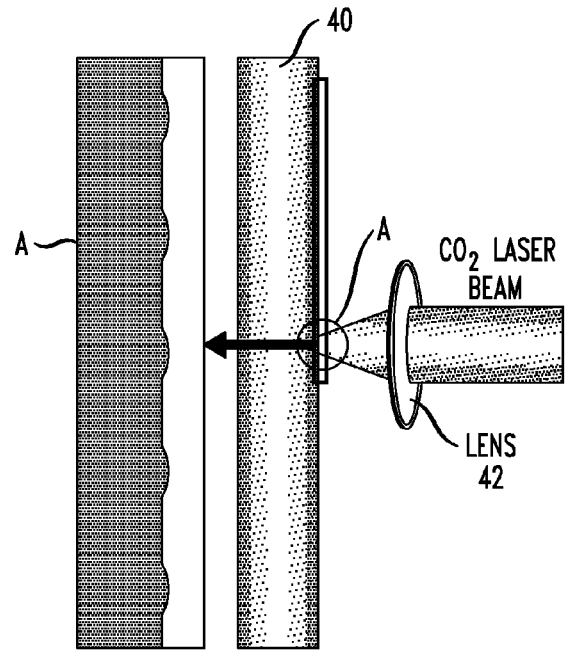
FIG. 4 illustrates an exemplary annealing process that may be used to create the SNAP device of FIG. 3.

To date, at least two different fabrication methods have been utilized to introduce nanoscale variations in effective radius for SNAP devices. The first method, as illustrated in FIG. 4, is based on local annealing of the optical fiber with a $CO_2$ laser beam. In this approach, the nanoscale modification of the optical fiber radius is created by the release of tension within the localized portion of the fiber that is being subjected to the $CO_2$ beam (i.e., the portion of the fiber being annealed). This original tension within the fiber is a known phenomenon and is created and "frozen" in place during the process of drawing down the fiber from an optical preform. Thus, the application of the annealing beam relaxes the tension and modifies the effective radius at that point. An enlarged view of section A of an optical fiber 40 is shown in FIG. 4, where the local variations in radius associated with performing annealing at different locations can be seen. The axial dimension of SNAP microresonators formed using this method can be modified by changing the focal length of parabolic lens 42, as well as by changing the beam power and exposure time of the laser source.

Figure 5:
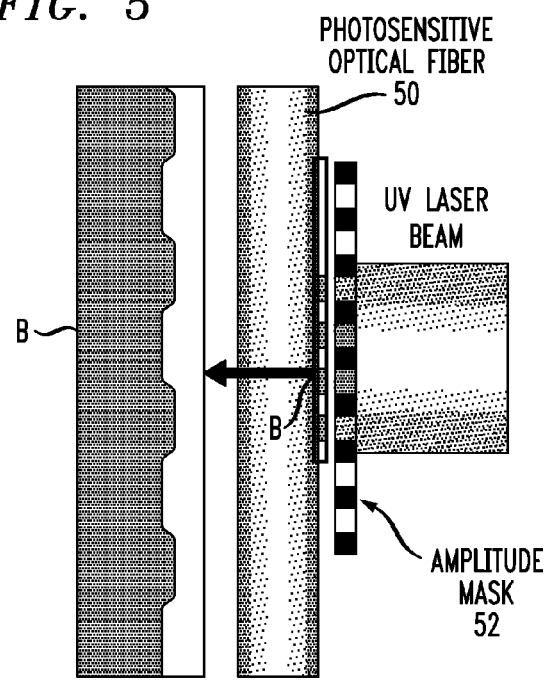
FIG. 5 illustrates an exemplary UV radiation process that may be used to create the SNAP device of FIG. 3 in a photosensitive optical fiber.

The second method, as illustrated in FIG. 5, is applicable to photosensitive optical fiber (e.g., Ge-doped fibers) and uses UV radiation to modify the effective radius of the optical fiber. In the arrangement as shown in FIG. 5, an optical fiber 50 is formed to include a particular dopant that introduces photosensitivity to the fiber, with the dopant concentration being related to the amount of effective radius change that can be created. In the arrangement as shown in FIG. 5, a UV beam passes through an appropriately-configured amplitude mask 52 that causes the UV light to create an interference pattern within photosensitive fiber 50. The presence of this UV radiation modifies the properties of the included dopant and therefore modifies the "effective" radius of fiber 50 within the section illuminated by the radiation. The details of the amplitude mask are determined to create the desired SNAP device structure. An enlarged view of section B of fiber 10, illustrating the UV-induced change in effective radius, is also shown in FIG. 5.

The annealing method can be thought of as similar to a "step and repeat" process, where the $CO_2$ beam performs an annealing at a first location A, and then moves to second location B and repeats the annealing process, where each location is associated with a desired microresonator position. Alternatively, a single UV exposure can be used to form a plurality of microresonator devices, as long as the amplitude mask is properly formed to define the location of each separate device.

While in theory either of these techniques can be used to form relatively long chains of microresonators along a single strand of light-supporting material (such as silica fiber), various fabrication errors have limited the length of an exemplary chain to a relatively few number of microresonators. These errors may include, for example, non-uniformity of the original optical fiber radius (on the nm-scale), surface contamination at various positions along the fiber, unintended fluctuations in annealing temperature, power, fluctuations in UV exposure, doping levels for creating photosensitivity, etc. While not problematic for larger-scale devices, these and other factors all contribute to introducing errors at the nanoscale level of radius variation, which limit the ability to create SNAP devices in the manner described above, since these SNAP devices rely on angstrom-precise modifications to create resonant behavior. Any minor variation in one or more of these identified parameters limits the capabilities of these devices.

The present invention addresses this remaining problem by introducing a "characterization and correction" process to the fabrication of SNAP devices. As will be described in detail below, a "treatment" in the form of either an annealing process or UV radiation exposure (as the case may be) is used to locally "trim" the initially-created effective radius variation in a manner that creates a final SNAP device with sub-Angstrom accuracy in its resonance features. As will be described below, the specifics of the process used to apply the corrective treatment is similar to that used to create the device in the first instance.

In an exemplary embodiment associated utilizing an annealing process, it has been found that there is an essentially linear relationship between the change in a fiber's effective radius and the parameters of a time-dependent exposure of annealing energy applied to a section of fiber. For example, as will be discussed below, it may be found during the calibration portion of the characterization and correction process that a treatment consisting of a 54 ms pulse from a $CO_2$ beam will create a 0.054 Å change in effective radius of an optical fiber with a 19 μm radius. Therefore, by knowing the local errors present in each resonator along a chain, the correction portion of the inventive process utilizes a series of annealing treatments to individually tailor the radius of each resonator and create the desired SNAP device.

Figure 6:
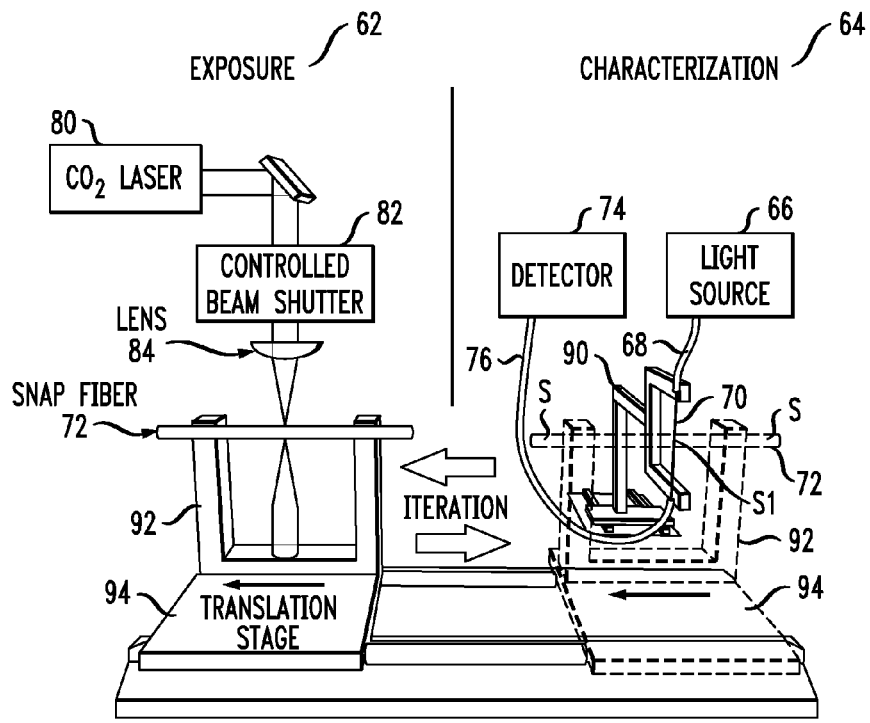
FIG. 6 illustrates an exemplary calibration (characterization) and correction (exposure) arrangement formed in accordance with the present invention to characterize and correct the resonant features of a SNAP device, such as the device shown in FIG. 3.

FIG. 6 illustrates an exemplary experimental setup 60 that may be used to calibrate and correct SNAP devices in accordance with the present invention. The illustrated setup 60 includes an exposure stage 62 and a characterization stage 64. For the purposes of this discussion, it will be presumed that a suitable method (such as shown in FIGS. 4 and 5) has been used to create a SNAP device in the first instance. In particular, it will be presumed that the selected process was used to create a chain of thirty microresonators along a section of (coreless) optical fiber, where the fiber had a nominal radius of 19 μm prior to creating the microresonators. Each resonator was separated by a spacing of 50 μm and, in this particular example, it was desired to create a set of resonators that all exhibit the same resonance wavelength λ of 1564.3 nm (with a sub-Angstrom accuracy).

In order to determine the amount of correction that may be necessary to provide a set of thirty resonators with only a sub-Angstrom variation in resonant wavelength, the first step in the inventive process is to characterize the set of as-created microresonators (that is, determine the resonant wavelength of each individual resonator). To that end, the SNAP device is positioned within characterization stage 64 of arrangement 60 as shown in FIG. 6, where characterization stage 64 is used to measure the resonant wavelength of each individual microresonator forming the SNAP device.

Figure 7:
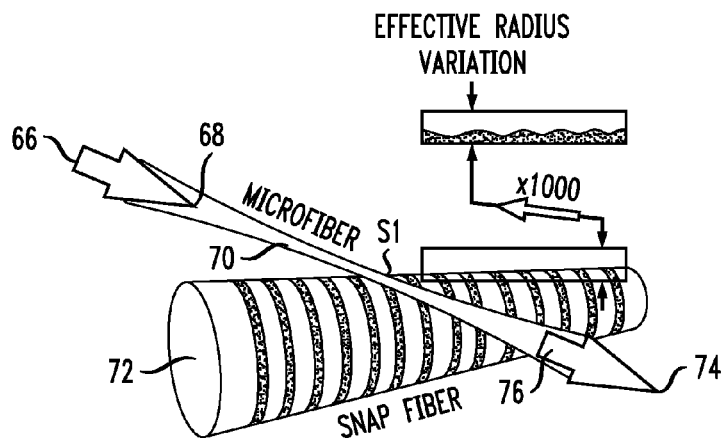
FIG. 7 is an enlarged view of an exemplary portion of the calibration arrangement of FIG. 6.

As discussed in detail in our co-pending application that has been incorporated by reference, the properties of the resonant structure can be characterized by using a set of microfiber-based measurements of the created microresonators. Characterization stage 64 accomplishes this measurement by using a light source 66 to create an optical beam which is thereafter coupled into an optical 68 fiber that tapers down to a microfiber 70. As described above, microfiber 70 is brought into contact with surface S of SNAP device 72 at a first location S1, which will thus evanescently couple a portion of the optical signal into SNAP device 72 at location D1. Inasmuch as this signal is coupled into a microresonator location along SNAP device 72, WGMs will circulate around the periphery of SNAP device 72 and introduce perturbations to the optical signal that continues to propagate along microfiber 70. The modified optical signal continues to propagate through microfiber 70 and is ultimately coupled into detector 74 via optical fiber 76. FIG. 7 is a close-up view of microfiber 70 as it is in contact with surface location S1 of SNAP device 72.

In order to fully characterize the set of microresonators formed along SNAP device 72, microfiber 70 is translated with respect to the longitudinal axis of SNAP device 72, creating a series of measurements associated with each microresonator along the chain. For example, microfiber 70 may be held in a fixturing assembly 90 that allows for microfiber 70 to move forward and backward (as shown in the diagram). SNAP device 72 itself may be held in a fixturing assembly 92 that is attached to a translation stage 94. In performing the characterization, microfiber 70 first touches SNAP device 72 and an initial measurement is made. Microfiber 70 is then drawn back, translation of microfiber 70 with respect to SNAP device 72 is made, and microfiber 70 is brought back into contact with a new surface location, and so on, as the microfiber is brought into contact with a number of locations along the length of SNAP device 72.

FIG. 8(a) is a surface plot of the 30-chain SNAP device 72, where this plot is formed by the series of measurements using microfiber 70 as described above. These measurements were obtained with a wavelength resolution on the order of 1.3 pm, with the measurements separated by a 10 μm spacing along the length of SNAP device 72. Recalling that this particular SNAP device 72 was intended to be formed as a series of thirty "uniform" microresonators with each exhibiting the same resonant wavelength, the results of the initial fabrication process can be analyzed.

In reviewing the spectra of FIG. 8(a), is it shown that that the spectra exhibit a fundamental transmission (resonance) band near the desired wavelength λ=1564.3 nm, followed by a band gap. The (unwanted) wavelength variation of resonances Δλ is shown by the scale on the left-hand vertical axis. In this particular example, the variation in resonant wavelength is on the order of 6 Å. Curve 1 of FIG. 9 illustrates the unwanted variation in resonant wavelength for the chain of thirty microresonators as being described herein, where the horizontal axis defines the location of each microresonator as a function of distance along the SNAP device. As discussed above, this unwanted variation is created by one or more errors in the fabrication process, and in order to create long chains of microresonators, it is desired to significantly reduce these variations, preferably to a sub-Angstrom level.

In accordance with the present invention, these variations are reduced by first performing a calibration process to determine the amount of effective radius change associated with a predetermined annealing pulse (i.e., "correction factor"). The determined correction factor to modify the radius of individual microresonators to improve the overall uniformity of the SNAP device. Indeed, this "characterization and correction" process may be performed more than once, with additional iterations used to fine-tune the effective radius of each microresonator until a desired level of accuracy is achieved. In the case of creating a set of "uniform" resonators, as being described, this "desired accuracy" is creating a SNAP device where all thirty resonators exhibit a resonant wavelength that may vary by only ±0.7 Å (with a standard deviation of 0.12 Å), for example.

Referring to FIG. 6, an exemplary calibration process is performed by moving SNAP device 72 into exposure stage 62. Exposure stage 62 is shown as including a $CO_2$ laser beam source 80, which directs the beam through a controlled beam shutter 82 and parabolic lens 84, focusing the annealing beam energy onto a desired location on SNAP device 72. The exposure time and energy of each time-dependent annealing treatment is determined by controlled shutter 82, and the spot size of the beam is controlled by the focal length of parabolic lens 84. A series of annealing treatments of controlled duration and power is used to modify the effective radius of a set of microresonators along the chain. In one case, an increasing number of annealing treatments is applied to each microresonator along the chain, with a single treatment applied to the first microresonator in the chain, two treatments applied in succession to the second microresonator in the chain, a series of three treatments applied to the third microresonator in the chain, etc (i.e., m annealing treatments applied to the $m^{th}$ resonator along the chain). In this particular example, each annealing process had an exposure length of 54 ms, and the re-positioning of the annealing process with respect to each microresonator was controlled by moving translation stage 94 so as to move SNAP device 72 along in an incremental fashion.

Figure 8:
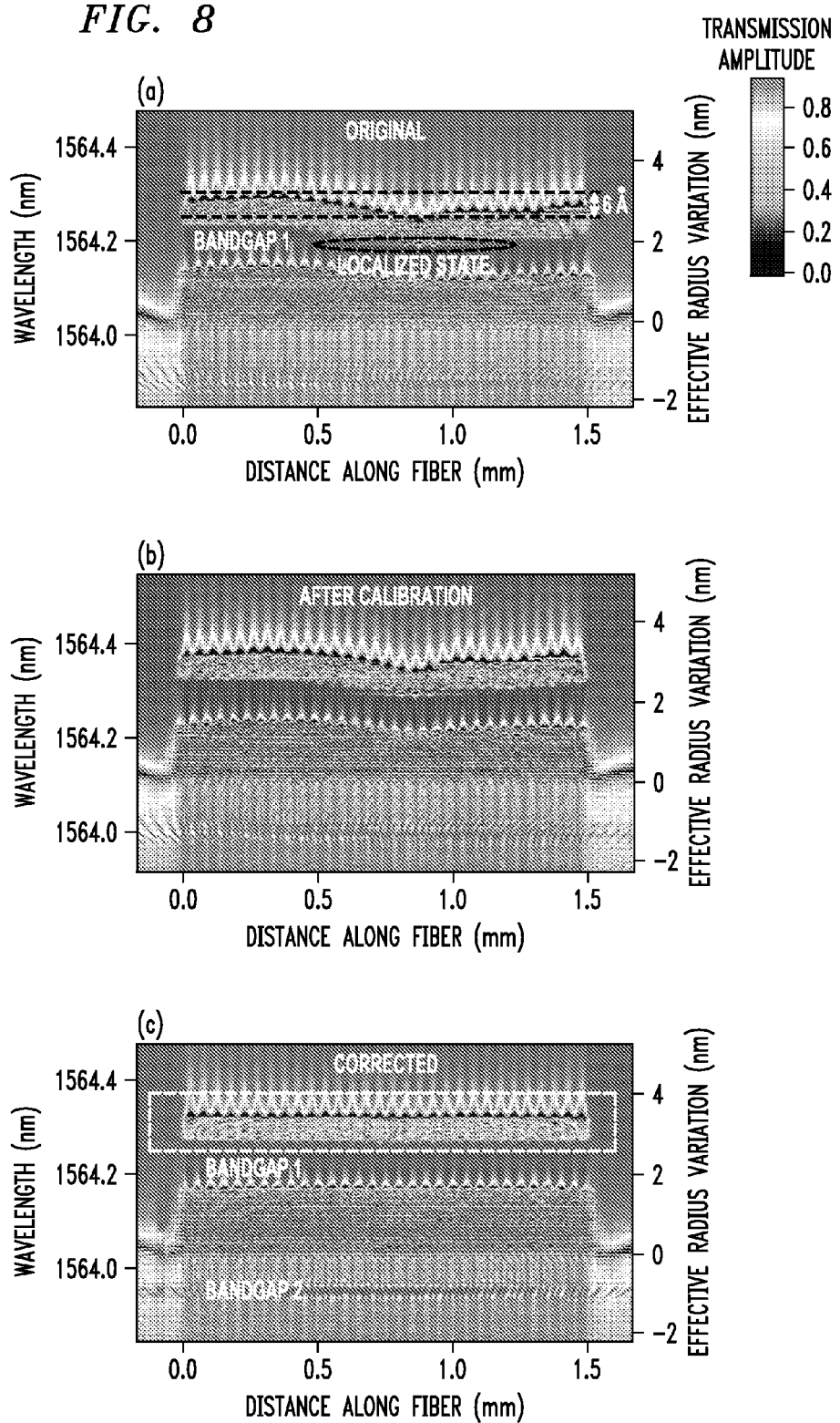
FIG. 8 includes a series of surface plots associated with a SNAP device containing a set of thirty resonators formed in accordance with the present invention, where
Figure 9:
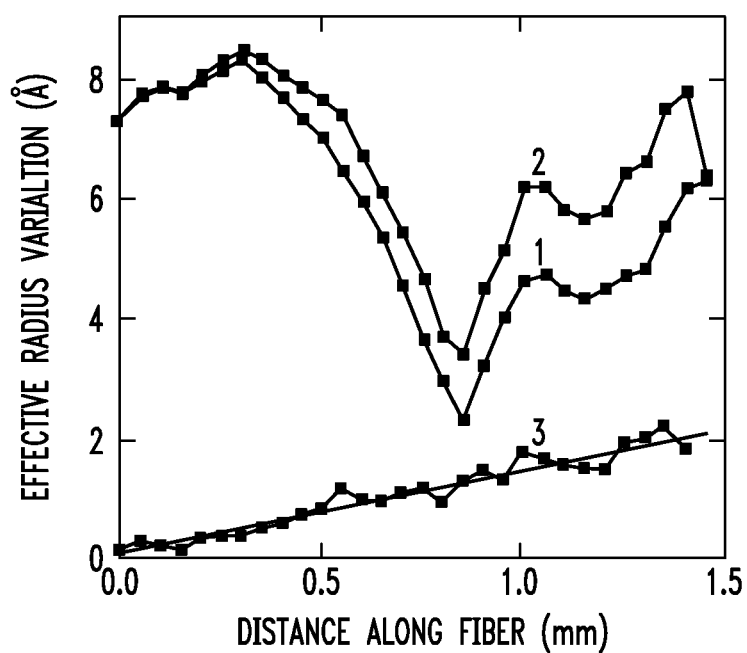
FIG. 9 contains a series of plots of effective radius variation that are associated with the measured surface plots of FIG. 8, with plot 1 associated with FIG. 8(a), plot 2 associated with FIG. 8(b) and plot 3 associated with FIG. 8(c).

At the completion of this calibration step, SNAP device 72 is returned to characterization stage 64, which repeats the same resonant wavelength measurement process, using microfiber 70 to determine the modified resonance wavelength of each microresonator along the chain. FIG. 8(b) shows the resonances as now provided by these "calibrated"

microresonators, with plot 2 of FIG. 9 illustrating the variation in effective radius along the chain for the measurements of FIG. 8(*b*).

Since the calibration process introduces a known modification to each individual resonator, it is possible to evaluate the results of plots 1 and 2 to determine the effective radius variation associated with a single "treatment". This is shown by plot 3 of FIG. 9, which is the difference between plots 1 and 2. Plot 3 clearly illustrates the linear relationship between the number of annealing treatments applied to a microresonator and the change in its effective radius (and, therefore, the change in resonant wavelength). For this particular device, it was found that a single 54 ms pulse (controlled by shutter 82) from a $CO_2$ laser source introduced an effective radius change of +0.054 Å. This +0.054 Å value is now defined as the "correction factor" for the remainder of the process of correcting the microresonators forming SNAP device 72.

Indeed, once this correction factor is determined, each separate resonator forming SNAP device 72 is corrected within exposure stage 62 by using the appropriate number of treatments required to modify its specific resonant wavelength. For example, presume that the resonant wavelength of resonator #4 along the chain needs to be increased by 0.27 Å. In this case and based upon the determined correction factor, a set of five treatments from the laser source will properly adjust its effective radius in a manner that creates the desired resonant wavelength. Resonator #12 may need only two treatments to correct its value, etc. FIG. 8(*c*) illustrates the results of performing this correction process, creating a set of thirty microresonators along SNAP device 72 that exhibit a variation in resonant wavelength on the order of only 0.56 Å.

While this example describes a correction process using an annealing procedure, it is to be understood that for a photosensitive SNAP device, a UV radiation process may be applied in the same manner (that is, measuring, calibrating and then correcting), where a specific time-dependent UV radiation process is defined as a specific "treatment" associated with providing a desired amount of change in resonant wavelength.

As mentioned above, once a first set of corrections has been made (using either annealing or UV radiation), the SNAP device can be moved back into characterization stage 64 and its spectra re-determined. Any further modifications in terms of "trimming" the effective radius of one or more resonator devices may be performed. This process can continue with additional iterations between the characterization stage and the exposure stage until the desired final characteristic of the SNAP device is achieved (in this case, a uniform resonant value along the entire chain). Indeed, an experimental process was found to create a set of thirty microresonators with a uniformity on the order of ±0.15 Å.

In this particular experiment, it was desired to create a set of resonators that all exhibit the same resonant wavelength. In general, it is to be understood that SNAP devices may be formed to exhibit any desired configuration (with, perhaps, each resonator having a different resonant wavelength, or tunable wavelengths, or any combination of these possibilities).

It is to be understood that many variations of the above-described calibration and correction process may be used. For example, the power and exposure time of the corrective treatment may be modified; lower power levels will create a relatively smaller change in effective radius and will therefore provide a "finer" resolution in results. Further, while the calibration process as described above utilizes an incrementally-increasing series of treatments applied to each resonator along the chain, another calibration process may use only a subset of the resonators to determine the correction factor. Indeed, with reference to FIG. 9, it is evident that the linearity of plot 3 is such that a fewer number of resonators could be used to determine the appropriate correction factor.

Moreover, the calibration and correction process of the present invention is considered to be useful with microresonators formed within any suitable light-guiding material. Silica is only one such exemplary material. As long as the resonances can be measured and calibrated, a process of modifying the individual resonance wavelengths based on the determined correction factor will allow for sub-Angstrom accuracy to be achieved.

What is claimed is:

1. A method of characterizing and correcting effective radius variations in a surface nanoscale axial photonic (SNAP) device that comprises a plurality of separate optical microdevices, comprising
   characterizing an as-fabricated SNAP device to determine local effective radius values of the plurality of separate optical microdevices;
   calibrating the as-fabricated SNAP device to determine a correction factor defined as a change in effective radius associated with a predetermined time-dependent effective radius-changing treatment; and
   correcting individual microdevices by an application of a number of effective radius-changing treatments, the number of treatments applied to individual microdevices determined by an amount of effective radius correction required and the correction factor determined in the calibrating step.

2. The method as defined in claim 1 wherein the calibrating step comprises:
   applying a predetermined number of treatments to a number of the separate optical microdevices, each optical microdevice receiving a different number of treatments;
   measuring local effective radius values of the number of separate optical microdevices; and
   determining a correction factor based on a difference between the initial, as-fabricated local effective radius values and a treated local effective radius value for each of the number of separate optical microdevices.

3. The method as defined in claim 2 wherein during the applying step, the predetermined number of treatments applied to each optical microdevice increases in an incremental fashion.

4. The method as defined in claim 3 wherein the predetermined number of treatments increments by one.

5. The method as defined in claim 2 wherein each optical microdevice forming the SNAP device is treated during the calibrating step.

6. The method as defined in claim 1 wherein the effective radius-changing treatment is a time-dependent annealing process for introducing a physical change in a local radius.

7. The method as defined in claim 6 wherein a laser source is used to perform the time-dependent annealing process, where a duration and power of the laser source output is controlled to define the amount of radius change that is created in a local optical microdevice.

8. The method as defined in claim 7 wherein a $CO_2$ laser source is used.

9. The method as defined in claim 1 wherein the SNAP device is a photosensitive device and the effective radius-changing treatment is a time-dependent UV radiation process for introducing a refractive index change, creating a change in effective radius.

10. The method as defined in claim 9 wherein a duration and power of a UV source is controlled to define the amount of refractive index change that is created in a local optical microdevice.

11. The method as defined in claim 1 wherein the SNAP device is formed along a length of optical fiber.

12. The method as defined in claim 11 wherein the SNAP device is formed along a length of coreless optical fiber having a nominal radius on an order of tens of µms.

13. The method as defined in claim 1 wherein the SNAP device is formed to include a plurality of separate optical microresonators.

14. The method as defined in claim 13 wherein the characterizing step is used to determine an as-fabricated resonant wavelength for each optical microresonator.

15. The method as defined in claim 1 wherein the calibrating and correcting steps are repeated a predetermined number of times.

16. The method as defined in claim 15 wherein the calibrating and correcting steps are repeated until an effective radius variation error less than one Angstrom is achieved.

17. An apparatus for performing characterization and correction of resonant characteristics of a surface nanoscale axial photonic (SNAP) device that comprises a plurality of separate optical microdevices, comprising
a characterization stage that measures a local resonant wavelength value for each individual optical microdevice; and
an exposure stage that applies a predetermined number of effective radius-changing treatments to individual optical microdevices, the predetermined number of treatments calculated based upon a known change in effective radius associated with a known energy and duration of an individual treatment.

18. The apparatus as defined in claim 17 wherein the characterization stage includes a light source and a detector, with an optical microfiber disposed therebetween to support propagation of an optical signal from the light source to the detector, the optical microfiber brought into contact with spaced-apart locations along the SNAP device to evanescently couple a portion of the propagating optical signal into the SNAP device and introduce whispering gallery modes (WGMs) that perturb the propagating signal in a manner where the detector measures local effective radius values of the plurality of separate optical microdevices.

19. The apparatus as defined in claim 17 wherein the exposure stage includes a laser source, a controlled beam shutter and a parabolic lens, the laser source for providing an annealing laser beam at a predetermined power to be directed against a surface of a SNAP device, the controlled beam shutter used to control power level and exposure time of the laser beam on the SNAP device surface, and the parabolic lens used to determine a spot size of the laser beam on the SNAP device surface.

20. The apparatus as defined in claim 17 wherein the exposure stage includes a UV radiation source, a controlled beam shutter and a parabolic lens, the UV radiation source for providing a beam at a predetermined power to be directed against a surface of a SNAP device, the controlled beam shutter used to control power level and exposure time of the UV radiation on the SNAP device surface, and the parabolic lens used to determine a spot size of the radiation on the SNAP device surface.

* * * * *